(12) United States Patent
Swerdlow

(10) Patent No.: US 12,093,900 B2
(45) Date of Patent: Sep. 17, 2024

(54) AGENDA INTELLIGENCE SYSTEM

(71) Applicant: Zoom Video Communications, Inc., San Jose, CA (US)

(72) Inventor: Nick Swerdlow, Santa Clara, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/243,873

(22) Filed: Apr. 29, 2021

(65) Prior Publication Data
US 2022/0351149 A1    Nov. 3, 2022

(51) Int. Cl.
*G06Q 10/00*      (2023.01)
*G06N 20/00*      (2019.01)
*G06Q 10/0631*    (2023.01)
*G06Q 10/1093*    (2023.01)
*H04L 12/18*      (2006.01)

(52) U.S. Cl.
CPC ......... *G06Q 10/1095* (2013.01); *G06N 20/00* (2019.01); *G06Q 10/06311* (2013.01); *H04L 12/1818* (2013.01); *H04L 12/1831* (2013.01)

(58) Field of Classification Search
CPC .............. G06Q 10/1097; G06Q 10/109–1095
See application file for complete search history.

(56) References Cited

U.S. PATENT DOCUMENTS 7,127,398 B1    10/2006  Yamagishi et al.
8,214,748 B2*   7/2012   Srikanth .............. G06Q 10/109
                                                          709/204
10,002,345 B2   6/2018   Ganani
10,200,468 B2*  2/2019   Leban .................. G06Q 10/109
10,268,990 B2*  4/2019   Kitada .................. G06Q 10/10
10,553,208 B2*  2/2020   Nelson .................... G10L 15/22
(Continued)

FOREIGN PATENT DOCUMENTS

CN    110869956 A    3/2020
EP    3309730 A1    4/2018

OTHER PUBLICATIONS

"Supporting virtual meetings in the overall business context" by Weigang Wang, Jorg M. Haake, Jessica Rubart, International Journal of Computer Applications in Technology (IJCAT), vol. 19, No. 3/4, 2004 (Year: 2004).*

(Continued)

*Primary Examiner* — Rutao Wu
*Assistant Examiner* — Scott M Ross
(74) *Attorney, Agent, or Firm* — Young Basile Hanlon & MacFarlane, P.C.

(57) ABSTRACT

Agenda intelligence software determines that agenda items are incomplete after time allotments therefor have elapsed during a multi-participant communication and alters an agenda of the multi-participant accordingly, such as using a transcription generated in real-time during the multi-participant communication. A software platform may in some cases include the agenda intelligence software, a transcription engine which generates the real-time transcription of the multi-participant communication, and a communication system which implements the multi-participant communication. The agenda may be altered by rescaling time allotments for other agenda items and/or by moving one or more other agenda items to an agenda for a next multi-participant communication.

20 Claims, 9 Drawing Sheets

(56) References Cited

U.S. PATENT DOCUMENTS

| | | | |
|---|---|---|---|
| 10,572,858 B2 | 2/2020 | Nelson et al. | |
| 10,860,985 B2* | 12/2020 | Nelson | G06Q 10/10 |
| 11,263,593 B1 | 3/2022 | Shetty et al. | |
| 11,521,179 B1 | 12/2022 | Shetty | |
| 11,627,006 B1 | 4/2023 | Chew et al. | |
| 2006/0224430 A1* | 10/2006 | Butt | G06Q 10/063116 |
| | | | 705/7.19 |
| 2008/0162244 A1* | 7/2008 | Oral | G06Q 10/1095 |
| | | | 705/7.19 |
| 2011/0225013 A1* | 9/2011 | Chavez | G06Q 10/109 |
| | | | 704/235 |
| 2012/0191500 A1* | 7/2012 | Byrnes | G06Q 10/1095 |
| | | | 705/7.19 |
| 2013/0254279 A1 | 9/2013 | Bentley et al. | |
| 2014/0082100 A1 | 3/2014 | Sammon et al. | |
| 2014/0164510 A1* | 6/2014 | Abuelsaad | G06Q 10/109 |
| | | | 709/204 |
| 2014/0344702 A1 | 11/2014 | Edge et al. | |
| 2015/0149929 A1 | 5/2015 | Shepherd et al. | |
| 2015/0154291 A1 | 6/2015 | Shepherd et al. | |
| 2016/0092578 A1* | 3/2016 | Ganani | G06F 16/24575 |
| | | | 707/728 |
| 2016/0104120 A1* | 4/2016 | Agrawal | G06Q 10/1095 |
| | | | 705/7.19 |
| 2016/0117624 A1 | 4/2016 | Flores et al. | |
| 2017/0034226 A1 | 2/2017 | Bostick et al. | |
| 2017/0293698 A1* | 10/2017 | Abebe | G06F 16/904 |
| 2018/0039951 A1* | 2/2018 | Wynn | G06Q 10/1095 |
| 2018/0101281 A1* | 4/2018 | Nelson | G06F 3/0482 |
| 2018/0101760 A1 | 4/2018 | Nelson et al. | |
| 2018/0101824 A1 | 4/2018 | Nelson et al. | |
| 2018/0191907 A1 | 7/2018 | Herrin et al. | |
| 2018/0322471 A1 | 11/2018 | Anderson et al. | |
| 2018/0365653 A1 | 12/2018 | Cleaver et al. | |
| 2019/0108834 A1* | 4/2019 | Nelson | G06N 5/04 |
| 2019/0132265 A1* | 5/2019 | Nowak-Przygodzki | |
| | | | H04L 12/1831 |
| 2019/0147882 A1 | 5/2019 | Pankanti et al. | |
| 2019/0228380 A1 | 7/2019 | Shen et al. | |
| 2019/0266238 A1 | 8/2019 | Faulkner et al. | |
| 2019/0295041 A1* | 9/2019 | Sim | G06Q 10/1095 |
| 2019/0325202 A1 | 10/2019 | Wang et al. | |
| 2020/0005248 A1 | 1/2020 | Gerzi et al. | |
| 2020/0052921 A1 | 2/2020 | van Rensburg | |
| 2020/0111046 A1* | 4/2020 | Ball-Marian | G06Q 10/0633 |
| 2020/0243095 A1* | 7/2020 | Adlersberg | G06F 40/216 |
| 2020/0401466 A1 | 12/2020 | Frost et al. | |
| 2020/0403817 A1 | 12/2020 | Daredia et al. | |
| 2021/0044697 A1 | 2/2021 | Khafizov et al. | |
| 2021/0117929 A1* | 4/2021 | Lewbel | G06Q 10/1095 |
| 2022/0391233 A1 | 12/2022 | Decrop et al. | |
| 2022/0394077 A1 | 12/2022 | Han | |
| 2023/0007063 A1 | 1/2023 | Gupta et al. | |
| 2023/0009268 A1 | 1/2023 | Zhang et al. | |
| 2023/0054480 A1 | 2/2023 | Wang et al. | |
| 2023/0083298 A1 | 3/2023 | Reece et al. | |
| 2023/0092702 A1 | 3/2023 | Mao et al. | |
| 2023/0169272 A1 | 6/2023 | Brantley et al. | |
| 2023/0223016 A1 | 7/2023 | Konam et al. | |
| 2023/0245646 A1 | 8/2023 | Parthasarathy et al. | |
| 2024/0095459 A1 | 3/2024 | McNeill et al. | |

OTHER PUBLICATIONS

International Search Report and Written Opinion mailed on Jun. 7, 2022 in corresponding PCT Application No. PCT/US2022/024829.
Talk Traces: Real-Time Capture and Visualization of Verbal Content in Meetings, CHI 2019 Paper, May 4-9, 2019. (14 pages).
International Search Report and Written Opinion mailed on Mar. 15, 2023 in corresponding PCT Application No. PCT/US2023/011242.
Antonios G Nanos etal., A Virtual Meeting System for the New Age, 2013 IEEE 10th International Conference on e-Business Engineering (Year: 2013).

* cited by examiner

AGENDA INTELLIGENCE SYSTEM

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform, which includes several communications services integrated over a network, such as the Internet, to deliver a complete communication experience regardless of physical location.

SUMMARY

Disclosed herein are, inter alia, implementations of agenda intelligence systems and techniques therefor.

One aspect of this disclosure is a method. The method includes identifying time allotments for agenda items associated with a multi-participant communication implemented using a software platform, detecting that a time allotment for a first agenda item of the agenda items has elapsed during the multi-participant communication using software of the software platform, determining that a status of the first agenda item is incomplete by software associated with the software platform processing a real-time transcription of the multi-participant communication, and altering an agenda for the multi-participant communication according to the elapsed time allotment and the incomplete status of the first agenda item by the software associated with the software platform.

Another aspect of this disclosure is a system. The system includes a communication system and an agenda intelligence system. The communication system is configured to implement a multi-participant communication. The agenda intelligence system is configured to alter a time allotment for a second agenda item of an agenda for the multi-participant communication in response to determining that a time allotment for a first agenda item of the agenda has elapsed during the multi-participant communication.

Yet another aspect of this disclosure is an apparatus. The apparatus includes a memory and a processor configured to execute instructions stored in the memory to determine that an agenda item of a multi-participant communication is incomplete when a time allotment for the agenda item has elapsed during the multi-participant communication and alter an agenda for the multi-participant communication according to the elapsed time allotment of the agenda item.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
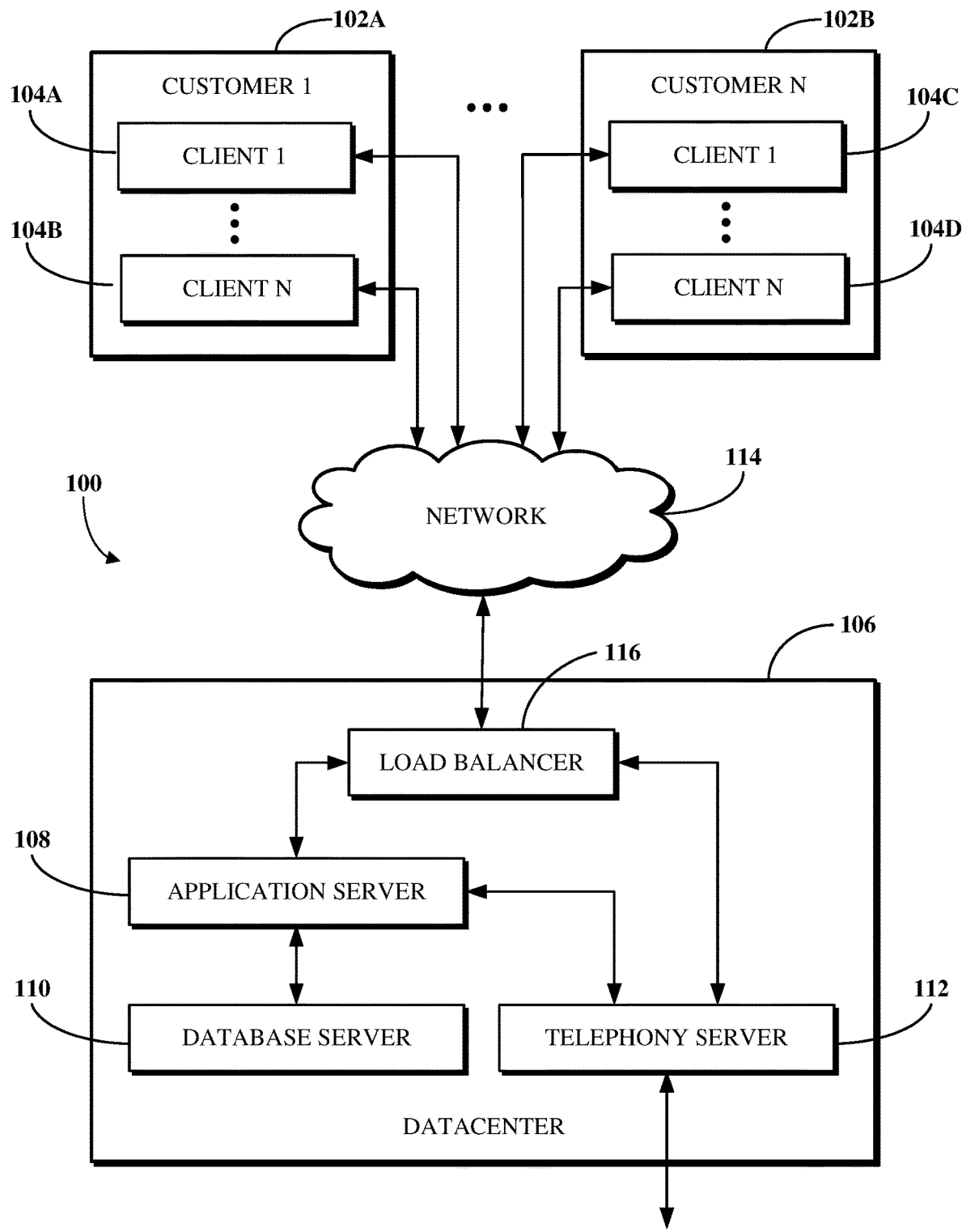
FIG. 1 is a block diagram of an example of an electronic computing and communications system.

Business of all types of industry rely upon multi-participant communications, such as telephone calls and conferences, to effectively discuss agenda items and complete internal tasks. Typically, a multi-participant communication may be scheduled by an invitation represented by a calendar appointment being placed on the schedules of the persons to attend as participants, and includes information for connecting to the multi-participant communication over one or more modalities. However, such invitations typically omit crucial information about the subject multi-participant communication, such as the nature or purpose thereof, the agenda items to cover therein, a relationship between the subject multi-participant communication and a previous one, an attendee list, and the like.

Furthermore, even where an invitation includes sufficient description of the multi-participant communication, it may be difficult such as due to limitations in call and conferencing technology to intelligently and automatically, such as within requiring user input, track which agenda items have been fulfilled during a multi-participant communication, which agenda items are still being discussed even after time allotments defined therefor have elapsed, and so on. This may be especially prudent where, as in many cases, participants converse without regard to the output of the call or conference itself, which results in time being misused and agenda items going uncompleted. However, there is no way to edit an existing agenda while the multi-participant communication is in progress except by disrupting the meeting to manually change it.

Implementations of this disclosure address problems such as these using an agenda intelligence system to adjust agendas for multi-participant communications while they are in progress and/or to generate agendas for next multi-participant communications based on determinations that agenda items of the current multi-participant communications were not completed during the current multi-participant communications. In particular, the implementations of this disclosure include using a transcription of a multi-participant communication generated in real-time during the multi-participant communication to determine completions of agenda items during the multi-participant communication, which agenda items are incomplete at the end of the multi-participant communication, whether time allotments for agenda items have elapsed during the multi-participant communication, and the like.

In some cases, the implementations of this disclosure determine that agenda items are incomplete after time allotments therefor have elapsed during a multi-participant communication and alters an agenda of the multi-participant accordingly, such as using a transcription generated in real-time during the multi-participant communication. A software platform may in some cases include the agenda intelligence software, a transcription engine which generates the real-time transcription of the multi-participant communication, and a communication system which implements the multi-participant communication. The agenda may be altered by rescaling time allotments for other agenda items and/or by moving one or more other agenda items to an agenda for a next multi-participant communication In some cases, the implementations of this disclosure determine completions of agenda items of a multi-participant communication using a transcription generated in real-time during the multi-participant communication and generates an agenda for a next multi-participant communication including incomplete agenda items. A software platform may in some cases include the agenda intelligence software, a transcription engine which generates the real-time transcription of the multi-participant communication, and a communication system which implements the multi-participant communication. The agenda generated for the next multi-participant communication may further include agenda items not previously identified for the multi-participant communication and determined using the real-time transcription of same.

To describe some implementations in greater detail, reference is first made to examples of hardware and software structures used to implement an agenda intelligence system. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, for example, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network, for example, a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phones which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
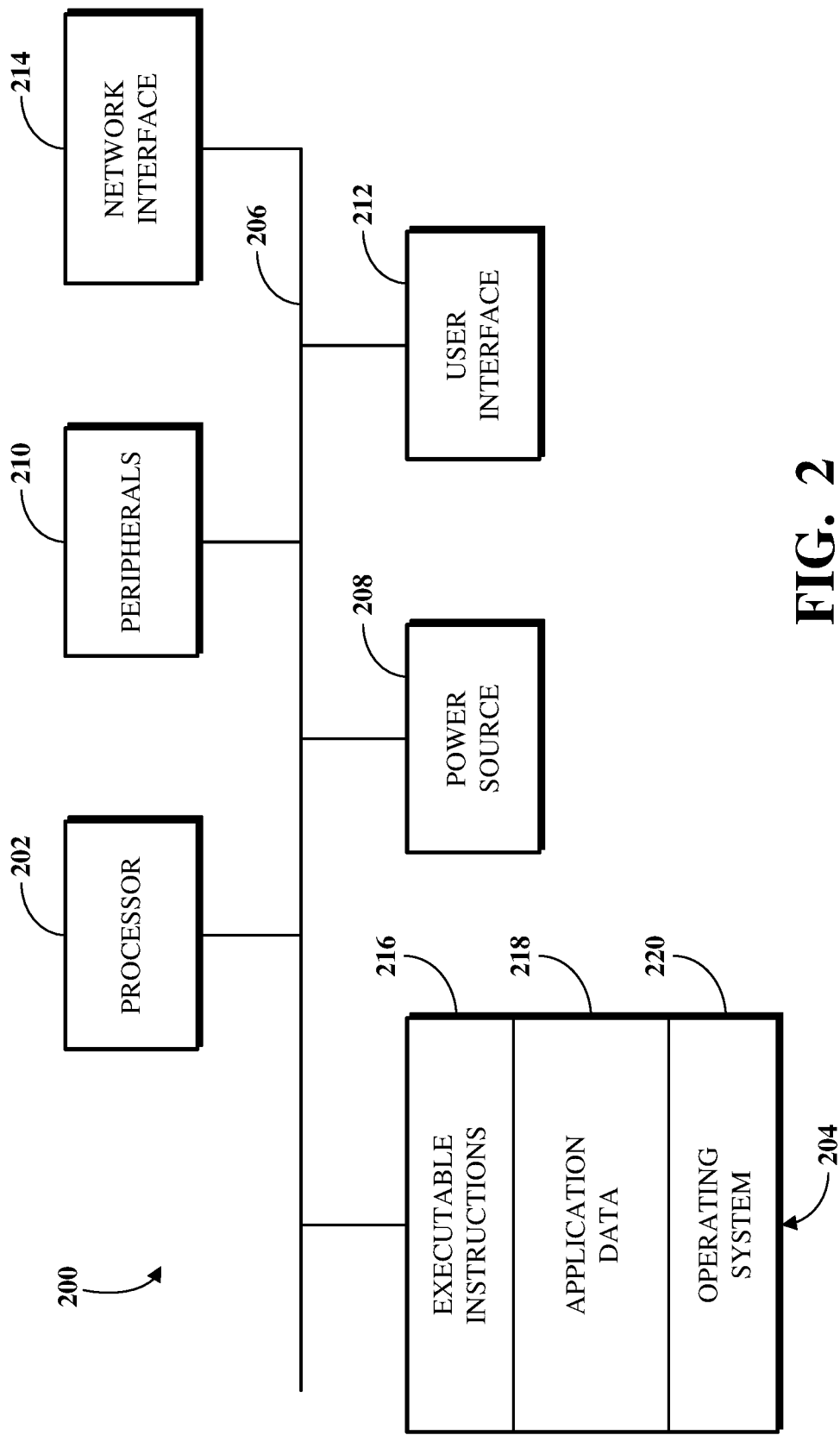
FIG. 2 is a block diagram of an example internal configuration of a computing device of an electronic computing and communications system.

FIG. 2 is a block diagram of an example internal configuration of a computing device 200 of an electronic computing and communications system, for example, a computing device which implements one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in one or more manners, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, general packet radio service (GPRS), global system for mobile communications (GSM), code-division multiple access (CDMA), Z-Wave, another protocol, or a combination thereof.

Figure 3:
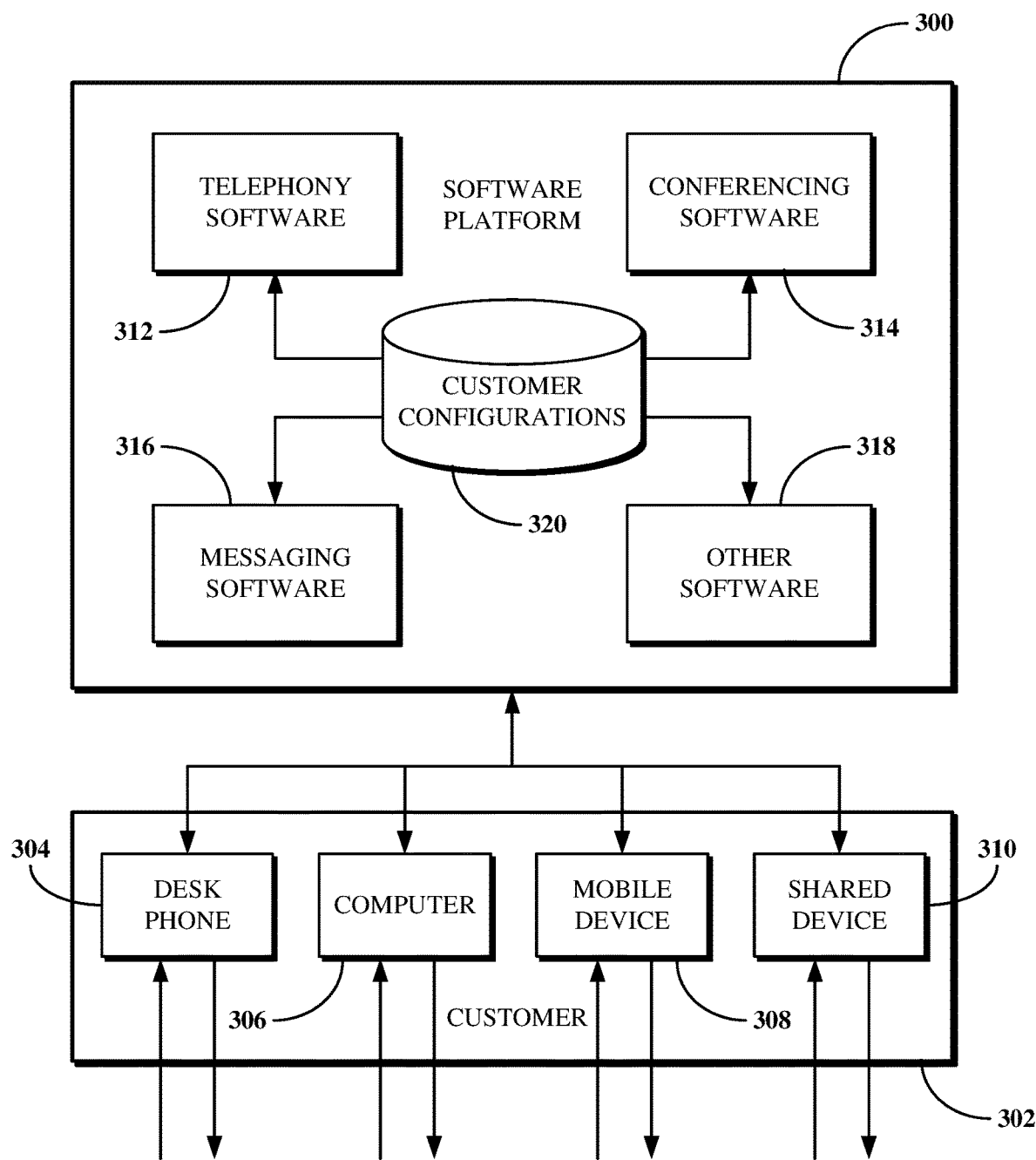
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. For example, the software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302, which may, for example, be the customer 102A, the customer 102B, or another customer, as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 312 is a desk phone, a computer, a mobile device, or a different device which may instead be configured for use by multiple specified or unspecified users Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones, multiple computers, etc.) and/or one or more clients of a client type not shown in FIG. 3 (e.g., wearable devices, televisions other than as shared devices, or the like). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 where same includes telephony features.

The telephony software 312 further enables phones which do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or like virtual conversation between users of those devices. The unified messaging functionality of the messaging software 316 may, for example, refer to email messaging which includes voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include agenda intelligence software for, for example, determining agenda items for a next conference based on an agenda for a current conference and for tracking time allotments for agenda items during a current conference.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304-310.

Figure 4:
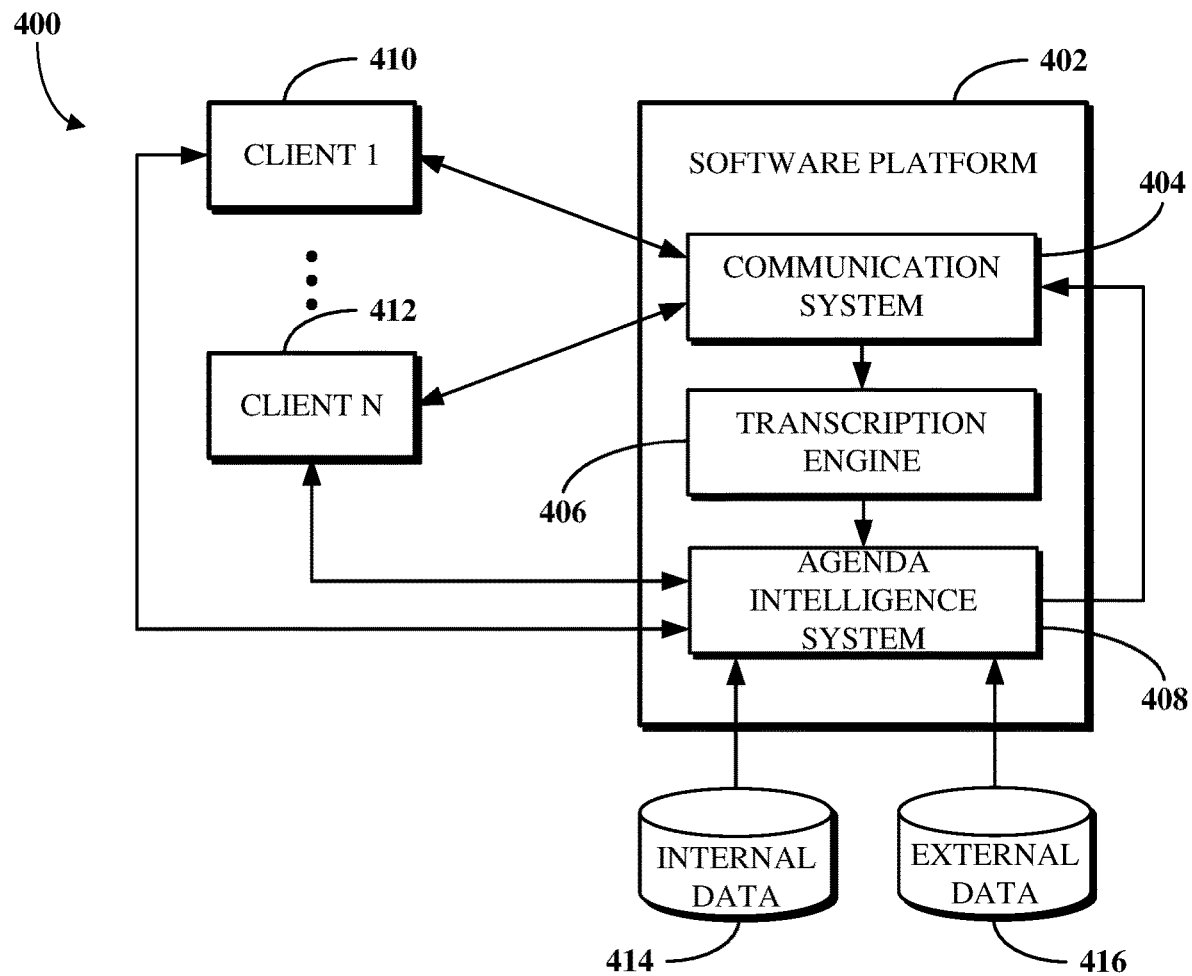
FIG. 4 is a block diagram of an example of a system for agenda intelligence.

FIG. 4 is a block diagram of an example of system 400 for agenda intelligence. The system 400 is implemented in hardware and software and is configured to generate or adjust an agenda for a multi-participant communication based on some criteria, for example, a determination that an agenda item is incomplete during a multi-participant communication or after the multi-participant communication ends, an identification of a new agenda item during a multi-participant communication or after the multi-participant communication ends, a time allotment for an agenda item being exceeded during a multi-participant communication, or the like. The system 400 is implemented in connection with a software platform 402, which may, for example, be the software platform 300 shown in FIG. 3. The software platform 402 includes a communication system 404, a transcription engine 406, and an agenda intelligence system 408.

The communication system 404 includes hardware and/or software used to implement a communication service, for example, a telephony service, a conferencing service, or another communication service. For example, where the communication service is a telephony service, the communication system 404 may include the telephony server 112 shown in FIG. 1 and/or the telephony software 312 shown in FIG. 3. In another example, where the communication service is a conferencing service, the communication system 404 may include the application server 108 shown in FIG. 1 and/or the conferencing software 314 shown in FIG. 3. The multi-participant communication may thus refer to a call between two or more people or a conference between two or more people. Each participant to the communication implemented at the communication system 404 connects to the communication system 404 using a client. For example, a first participant may be a user of a client 1 410 and a second participant may be a user of a client N 412 in which N is an integer having a value greater than 1.

The transcription engine 406 includes hardware and/or software which uses automatic speech recognition and natural language processing to generate a transcription of a communication implemented by the communication system 404 in real-time. The transcription engine 406 receives audio data from the communication system 404 (e.g., received from one or more audio channels opened between the communication system 404 and each of the client 1 410 through the client N 412) and processes the audio data to generate the transcription of the communication in real-time. In some implementations, the communication system 404 may include the transcription engine 406. In some implementations the agenda intelligence system 408 may include the transcription engine 406. In some implementations, the transcription engine 406 may be external to the software platform 402.

The agenda intelligence system 408 includes hardware and/or software used in connection with various agenda features of the software platform 402. In particular, the agenda intelligence system 408 is configured to generate an agenda for a conference implemented using the communication system 404, identify agenda items to include within an agenda using information obtained from one or more of the client 1 410 through the client N 412 or another device in communication with the software platform 402, identify agenda items to include within an agenda using a transcription generated using the transcription engine 406, identify agenda items to include within an agenda based on internal data 414 associated with the software platform 402 and/or external data 416 associated with one or more sources external to the software platform 402, determine that an agenda item for a current communication is incomplete based on a transcription generated during the current communication using the transcription engine 406, determine that a time allotment for an agenda item has elapsed during a current communication, alter an agenda for a current communication or a next communication in response to determining that a time allotment for an agenda item has elapsed, and the like. Implementations and examples of using the system 400 for scaling time allotments of agenda items during a current conference are described below with respect to FIG. 6. Implementations and examples of using the system 400 for generating an agenda for a next conference based on completion of agenda items for a current conference are described below with respect to FIG. 7.

The agenda intelligence system 408 is a separate hardware and/or software aspect of the software platform 402 and is thus configured to separately integrate with one or more aspects of the software platform 402, including a first communication system (e.g., a telephony system) implemented by the communication system 404, a second communication system (e.g., a conferencing system) implemented by the communication system 404, and so on. However, in some implementations, the communication system 404 may include the agenda intelligence system 408. For example, instead of the agenda intelligence system 408, as a single, separate hardware and/or software aspect of the software platform 402, sitting on top multiple various services of the software platform 402, some or all of those services of the software platform 402 may include their own implementations of the agenda intelligence system 408.

The agenda intelligence system 408 may use information received from one or more of the client 1 410 through the client N 412 to generate an agenda for a communication. For example, a client, such as one of the client 1 410 through the client N 412, may access the agenda intelligence system 408 to generate an agenda for a communication to be implemented using the communication system 404. The agenda intelligence system 408 may also or instead use the internal data 414 and/or the external data 416 to generate an agenda for a communication.

The internal data 414 includes data representative of one or more services of the software platform 402, one or more users of the software platform 402, a knowledgebase associated with the software platform 402 or one or more services or users thereof, or the like. For example, the internal data 414 may be data from a system of a customer of the software platform 402 (e.g., the customer 1 102A or the customer N 102 B shown in FIG. 1). For example, the internal data 414 may be data from an internal product page, an employee skills page, human resource records, internal directory service records, records of chat logs or other messages between employees of or other uses associated with the customer, or the like. The internal data 414 is stored in a data store, database, repository, or other storage aspect of the software platform 402. The internal data 414 may thus be accessed by the agenda intelligence system 408 using access privileges natively configured by the software platform 402.

The external data 416 includes data from a website, social media platform, third party software service, or other resource external to the software platform 402. The external data 416 is stored in a data store, database, repository, or other storage aspect external to the software platform 402. The external data may thus be accessed by the agenda intelligence system 408 using an application programming interface (API) or other exposed interface available by the source or sources of the external data 416.

An agenda generated using the agenda intelligence system 408 may be shared within one or more participants of a multi-participant communication implemented using the communication system 404, for example, users of the client 1 410 through the client N 412. For example, an agenda of a current communication may be shared with participants invited to the current communication. In another example, an agenda of a next communication may be shared with participants invited to the next communication, in which the participants invited to the next communication may include some or all of the participants invited to the current communication and/or one or more participants not invited to the current communication.

In some implementations, an agenda generated, altered, or otherwise processed using the agenda intelligence system 408 may be output to display to one or more of the client 1 410 through the client N 412 for the users of those clients to view the agenda while participating in the multi-participant communication implemented using the communication system 404.

Figure 5:
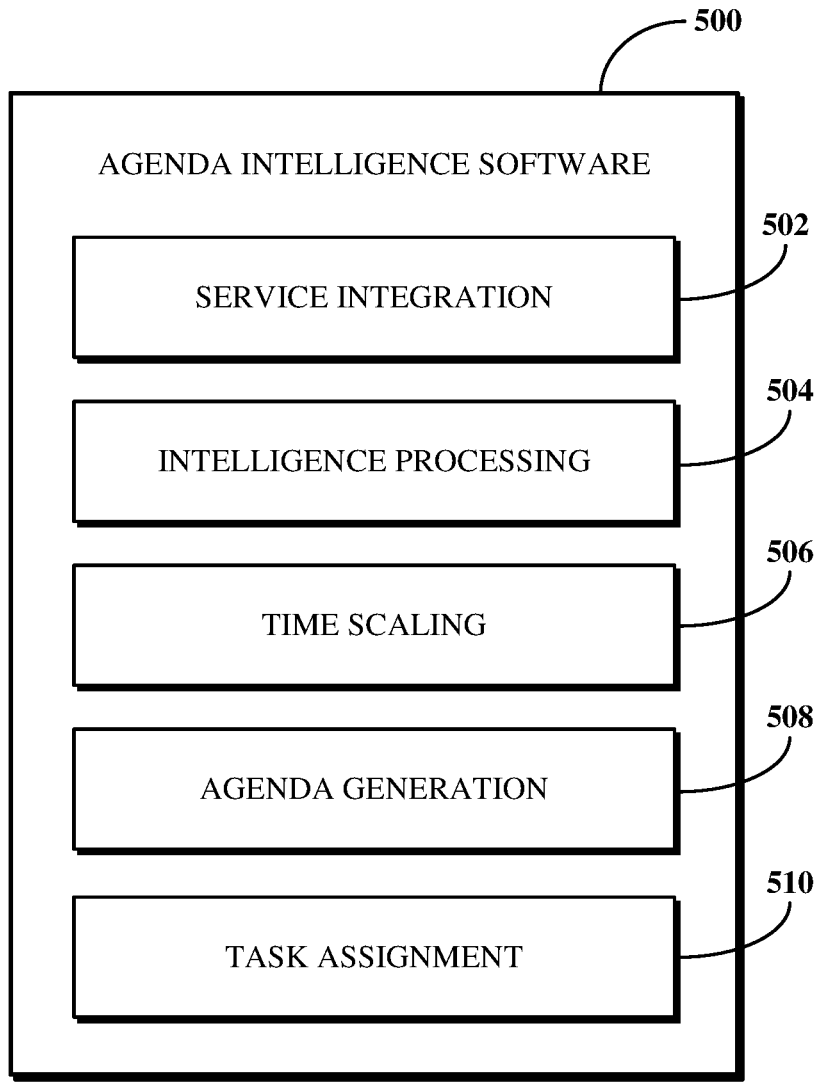
FIG. 5 is a block diagram of example functionality of agenda intelligence software of a software platform.

FIG. 5 is a block diagram of example functionality of agenda intelligence software 500 of a software platform, which may, for example, be the software platform 402 shown in FIG. 4. The agenda intelligence software 500 is run at a server, which may, for example, be a server of the agenda intelligence system 408 shown in FIG. 4. For example, the agenda intelligence software 500 may represent software functionality of the agenda intelligence system 408. As shown, the agenda intelligence software 500 includes a service integration tool 502, an intelligence processing tool 504, a time scaling tool 506, an agenda generation tool 508, and an action item assignment tool 510.

The service integration tool 502 integrates the agenda intelligence software 500 with one or more services of a software platform, for example, the software platform 402 shown in FIG. 4. The services may, for example, include one or more communication services implemented using one or more communication systems, for example, the communication system 404 shown in FIG. 4. For example, the service integration tool 502 may include or otherwise use one or more configurations of the software platform defining access control for the agenda intelligence software 500 to retrieve data from and otherwise use services of the software platform. In some implementations, the service integration tool 502 may integrate the agenda intelligence software 500 with one or more services external to a software platform. For example, the service integration tool 502 may use one or more APIs or other integrations of the external services to a software platform enable an exchange of data between the agenda intelligence software 500 and an external service.

The intelligence processing tool 504 is a software intelligence aspect which processes a transcription of a multi-participant communication in real-time during the multi-participant communication. For example, the transcription may be a transcription generated using a transcription engine, such as the transcription engine 406 shown in FIG. 4. The intelligence processing tool 504 searches for keywords associated with agenda items within the transcription of the multi-participant communication, as the transcription is generated in real-time with the progression of the multi-participant communication. The intelligence processing tool 504 outputs data associated with an agenda item including the agenda item discussed based on the processing of the transcription and a timestamp representative of the time of the discussion of the agenda item during the multi-participant communication. The software intelligence aspect may, for example, a machine learning model, such as one or more of a neural network (e.g., a convolutional neural network, recurrent neural network, or other neural network), decision tree, vector machine, Bayesian network, genetic algorithm, deep learning system separate from a neural network, or other machine learning model.

The time scaling tool 506 alters an agenda for a multi-participant communication in response to determining that a time allotment for an agenda item of the agenda has exceeded a time allotment defined for the agenda item and determining that the agenda item is incomplete. In particular, the time scaling tool 506 tracks the timing of a multi-participant communication in connection with agenda items for the multi-participant communication. The agenda items for a multi-participant communication are established before the multi-participant communication begins. The multi-participant communication has a time duration, which may be configured when scheduling the multi-participant communication. The agenda items are each given some allotted portion of that time. For example, a first agenda item may be allotted to the first ten minutes of the communication, a second agenda item may be allotted to the following five minutes, and so on. The time allotment for an agenda item may be determined based on user input, weights deduced such as based on agenda item significance, or other manners.

The time scaling tool 506 uses timestamps output by the intelligence processing tool 504 to determine whether time allotments for agenda items have elapsed. In the event the timestamp represents a time after the time allotment for the subject agenda item has elapsed, the time scaling tool 506 can alter the agenda for the multi-participant communication. For example, the time scaling tool 506 can rescale the time allotments for one or more of the remaining agenda items of the multi-participant communication and/or move one or more of those remaining agenda items to an agenda for a next multi-participant communication. An agenda item may, for example, be considered to be a remaining agenda item where it has not yet been completed during the multi-participant communication. For example, the time scaling tool 506 may use the transcription generated for the multi-participant communication to determine whether a given agenda item has been completed.

The time scaling tool 506 may further alter an agenda for a multi-participant communication by adding new agenda items thereto. For example, the time scaling tool 506 may use output of the intelligence processing tool 504 which detects when a transcription of the multi-participant communication indicates that a topic not related to one of the existing agenda items is being discussed during the multi-participant communication. The time scaling tool 506 may, for example, measure an amount of time during which a new topic is being discussed, such as based on a first timestamp identified for the new topic, representing a first time within the transcription at which the new topic is referenced. Where the amount of time exceeds a threshold (e.g., two minutes), the time scaling tool 506 may present a recommendation to one or more of the participants of the multi-participant communication to add a new agenda item associated with the topic (e.g., based on a most frequently used keyword for the topic as represented within the transcription) to the agenda for the multi-participant communication. Adding a new agenda item may cause the time allotments for one or more remaining agenda items to be rescaled and/or cause one or more of those remaining agenda items to be moved to a different agenda, such as for a next multi-participant communication. For example, new agenda items added during a current multi-participant communication for discussion during the current multi-participant communication may by default by considered high priority such that lower priority items may be pushed to a next multi-participant communication.

The time scaling tool 506 may further alter an agenda for a multi-participant communication based on a determination that an agenda item has been completed before its time allotment has elapsed. For example, the processing of the transcription performed by the intelligence processing tool 504 may determine that a topic associated with a given agenda item is no longer being discussed. The intelligence processing tool 504 may further determine that a current topic of discussion as reflected by the transcription corresponds to a next agenda item within the agenda of the multi-participant communication. A determination may thus be made that the given agenda item has been completed ahead of its allotted time. In another example, a voice agent of the software platform which is configured to collect and/or process spoken input received from a user of the software platform may receive spoken input indicating a completion of an agenda item. For example, the voice agent may include various user controls configured for agenda purposes. Those user controls may include spoken input such as "next item" or the like, which, when detected by the voice agent, causes the time scaling tool 506 or another tool of the agenda intelligence software 500 to determine that a current agenda item has been completed. Regardless of the manner of detection, the agenda may be altered by scaling time allotments for the remaining agenda items to cover the portion of time not used within the time allotment for the completed agenda item. For example, the remaining portion of time within that time allotment may be evenly divided amongst the remaining agenda items. In another example, some or all of that remaining portion of time within that time allotment may be used to increase the time allotment for one or more high priority agenda items.

The agenda generation tool 508 generates an agenda for a second multi-participant communication, in which the agenda includes an agenda item from a first multi-participant communication, in response to determining that the agenda item is incomplete when the first multi-participant communication ends. In particular, the agenda generation tool 606 identifies agenda items associated with a current multi-participant communication, referred to as a first multi-participant communication, detects one or more of those agenda items which have been completed during the first multi-participant communication, and generates an agenda for a next multi-participant communication, referred to as a second multi-participant communication, in which the agenda for the second multi-participant communication includes one or more agenda items of the first multi-participant communication which were not completed during the first multi-participant communication and/or one or more new agenda items identified during the first multi-participant communication but which were not themselves agenda items on the agenda for the first multi-participant communication.

The agenda generation tool 508 determines agenda items to include within a new agenda to generate for a next multi-participant communication in one or more ways. In one example, the agenda generation tool 508 identifies an agenda item to include in an agenda for the next multi-participant communication based on indications of existing and new agenda items detected within output of the intelligence processing tool 504. In another example, the agenda generation tool 508 identifies an agenda item to include in an agenda for the next multi-participant communication based on a user selection of text from a digital content source, which may, for example, be a message associated with the current multi-participant communication, a resource internal to the software platform, or a resource external to the software platform. In still a further example, the agenda generation tool 508 identifies an agenda item to include in an agenda for the next multi-participant communication based on spoken input from a user of the software platform collected using an agent of or otherwise connected to the software platform.

The action item assignment tool 510 determines users of a software platform to assign action items to based on agenda items determined for an agenda for a multi-participant communication. Agenda items may in some cases have actions associated with them, in which case one or more users of the software platform or other participants of a multi-participant communication may be tasked with completing some or all of an action. The action items associated with the agenda items of an agenda operate as a form of to-do list which can be shared across modalities, for example, chat, email, and so on. The action item assignment tool 510 determines a person to whom to assign an action item based on one or more keywords identified within a transcription of the multi-participant communication from which the action item arose. For example, the action item assignment tool 510 may search metadata associated with users of the software platform, such as within an internal data store of the software platform (e.g., the internal data 414 shown in FIG. 4) or within an external data store (e.g., the external data 416 shown in FIG. 4), based on the keywords identified within the transcription. This may, for example, be done to identify a person who is skilled in an area associated with the action item, a person who has been determined to frequently use keywords associated with the action item in messages, a person who has keywords associated with the action item listed in a website or internal directory service, or the like.

In some implementations, the agenda intelligence software 500 may include other tools in addition to and/or instead of the tools 502 through 510. For example, the agenda intelligence software 500 may include an agenda rearrangement tool which tracks the real-time participation of one or more participants invited to attend a multi-participant communication and rearranges the order of agenda items for the multi-participant communication according to one or more conditions. In particular, in some such implementations, the agenda rearrangement tool may use an invite list to determine participants who have been invited to attend the multi-participant communication. The intelligence processing tool 504 can process a transcription of the multi-participant communication to determine whether based on keywords and/or context a given participant is not in attendance or is otherwise not present during a conversation, such as by others saying the person's name repeatedly without answer. Alternatively, an integration with the communication service via the service integration tool 502 can indicate the participants who are in attendance, and the remaining ones can be deduced thereby. In either such case, where a given participant is not actively attending or otherwise present during the multi-participant communication is assigned to a given agenda item, such as due to their subject matter expertise in a topic associated with the given agenda item, that agenda item can either be rearranged to a later time in the agenda of the multi-participant communication or moved to a new agenda generated (e.g., using the agenda generation tool 508) for a next multi-participant communication.

Although the tools 502 through 510 are shown as functionality of the agenda intelligence software 500 as a single piece of software, in some implementations, some or all of the tools 502 through 510 may exist outside of the agenda intelligence software 500 and/or the software platform may exclude the agenda intelligence software 500 while still including the some or all of tools 502 through 510 in some form elsewhere.

Figure 6:
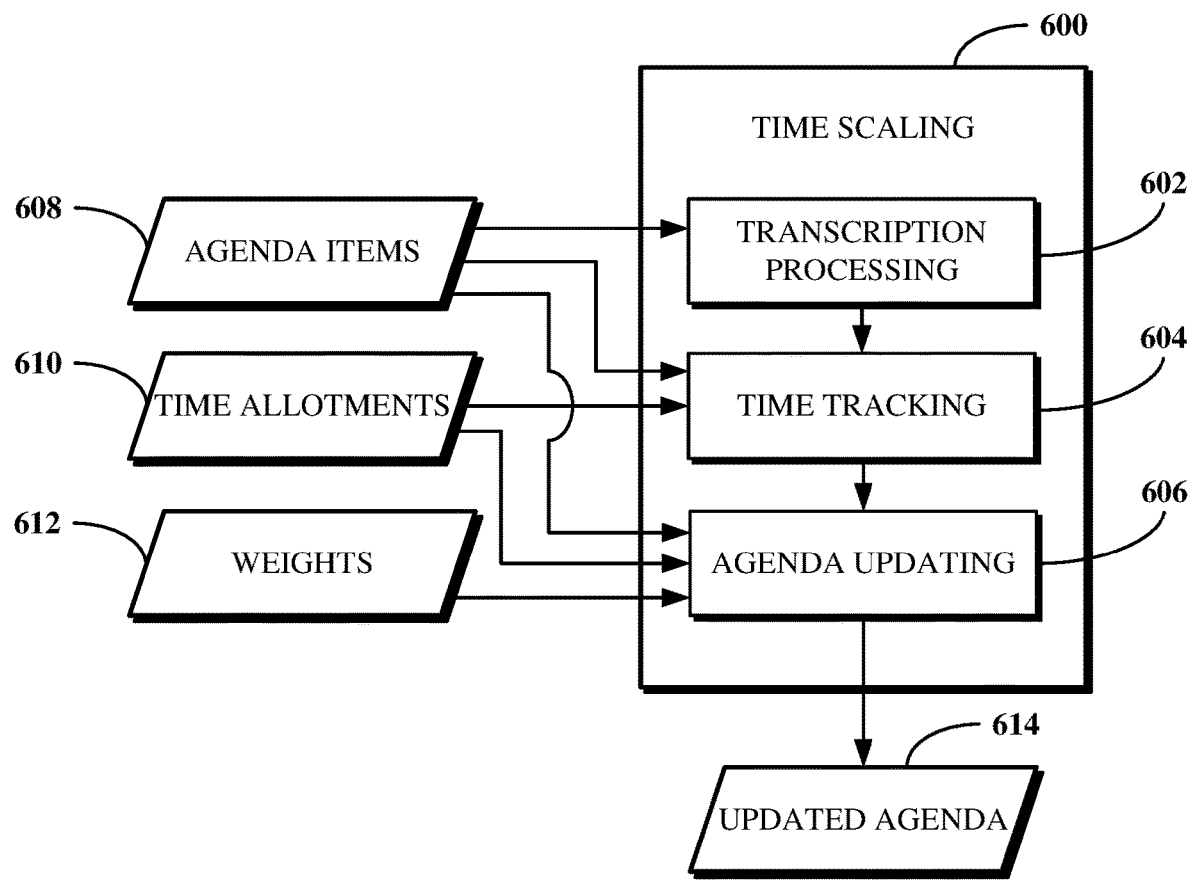
FIG. 6 is a block diagram of an example of time scaling functionality of an agenda intelligence system.

FIG. 6 is a block diagram of an example of time scaling functionality of an agenda intelligence system, which may, for example, be the agenda intelligence system 408 shown in FIG. 4. The time scaling functionality of the agenda intelligence system is implemented by a time scaling tool 600, which may, for example, be the time scaling tool 506 shown in FIG. 5. The time scaling tool 600 includes a transcription processing tool 602, a time tracking tool 604, and an agenda updating tool 606. The time scaling tool 600 receives as input agenda items 608, time allotments 610, and weights 612 and generates an updated agenda 614 as output.

The agenda items 608 are agenda items identified for a multi-participant communication. The agenda items 608 may, for example, be included in an agenda generated using an agenda generation tool, for example, the agenda generation tool 508 shown in FIG. 5, based on a previous multi-participant communication.

The time allotments 610 are time allotments assigned for agenda items of an agenda of a multi-participant communication. The time allotments 608 are specific to the agenda in which each of the agenda items has a specified time allotment and the sum of the time allotments is equal to or less than the total amount of time scheduled for the multi-participant communication.

The weights 612 are weight values to be given to certain agenda items based on a priority thereof. For example, normal priority agenda items may have a weight of 1.0, low priority agenda items may have a weight which is lower than 1.0, and high priority agenda items may have a weight which is greater than 1.0. The weights 612 may be determined by a user of the software platform or by the agenda intelligence system, for example, based on a context of the multi-participant communication. For example, an agenda item 608 may have a higher weight where it was included in the subject agenda because it was moved from an agenda of a previous multi-participant communication, where it includes one or more keywords associated with a title assigned to the multi-participant communication, where it has a time allotment 610 that is greater than an average time allotment 610 of the agenda items 608, where it is ordered early in the agenda, or the like. In another example, an agenda item 608 may have a lower weight where it is ordered late in the agenda, where it has a time allotment 610 that is lower than an average time allotment 610 of the agenda items 608, where it does not include any keywords in common with a title assigned to the multi-participant communication, or the like.

The transcription processing tool 602 uses the agenda items 608 to determine when the agenda items are being discussed during a multi-participant communication. The transcription processing tool 602 may, for example, refer to software which processes an agenda generated in real-time during the multi-participant communication to determine whether an agenda item has been completed during the multi-participant communication or whether it is incomplete when the multi-participant communication ends. For example, the transcription processing tool 602 may be or include the intelligence processing tool 504 shown in FIG. 5. The transcription processing tool 602 outputs an indication of an agenda item 608 and a timestamp representative of a time during the multi-participant communication in which the agenda item 608 is being discussed by the participants thereof.

The time tracking tool 604 uses the agenda items 608, the time allotments 610, and the output of the transcription processing tool 602 to determine whether a time allotment 610 for an agenda item 608 has elapsed. For example, the time tracking tool 604 uses the time allotments 610 to understand, based on a start time of a multi-participant communication, an expected end time for the time allotment 610 of a given agenda item 608. The time tracking tool 604 then compares the timestamp received as output from the transcription processing tool 602 for the given agenda item 608 against that expected end time to determine whether the time allotment 610 for that agenda item 608 has elapsed. The time tracking tool 604 outputs an indication of whether the time allotment 610 for the agenda item 608 has elapsed.

In some implementations, the time tracking tool 604 can track whether agenda items with high weights have been completed during a multi-participant communication based on the real-time transcription and an amount of time which has elapsed during the multi-participant communication. For example, the time tracking tool 604 can calculate a total time allotment representing the sum of time allotments for all high priority agenda items. The time tracking tool 604 can monitor the multi-participant communication based on that total time allotment to ensure that an amount of time remaining within the multi-participant communication is greater than or equal to that total time allotment. In the event the amount of time remaining within the multi-participant communication is less than that total time allotment, the time tracking tool 604 may cause some visualization to be rendered within a graphical user interface output to the display of one or more devices connected to the communication service implementing the multi-participant communication. For example, the visualization can include an attention-catching aesthetic or flash intended to indicate that remaining time within the multi-participant communication should be spend discussing the high priority agenda items.

The agenda updating tool 606 uses the agenda items 608, the time allotments 610, the weights 612, and the output of the time tracking tool 604 to alter an agenda of the multi-participant communication, such as by rescaling the time allotments 610 of one or more of the remaining agenda items 608, moving one or more of the remaining agenda items 608 to an agenda for a next multi-participant communication, or both. For example, the agenda updating tool 606 may alter the agenda by rescaling all of the time allotments 610 for the remaining agenda items 608 evenly, such as by evenly reducing those time allotments 610. In another example, the agenda updating tool 606 may alter the agenda by rescaling only the time allotments 610 associated with the agenda items 608 having low weights 612. In another example, the agenda updating tool 606 may alter the agenda by moving one or more agenda items 608, for example, with low weights 612 to an agenda for a next multi-participant communication. The output of the agenda updating tool 606 is an updated agenda 614.

The functionality of the time scaling tool 600 may be realized at one or times during a multi-participant communication. For example, the operations performed by the transcription processing tool 602, the time tracking tool 604, and the agenda updating tool 606 may be continuously performed during the multi-participant communication. In another example, the operations performed by the transcription processing tool 602, the time tracking tool 604, and the agenda updating tool 606 may be performed at a discrete time interval (e.g., once per minute or otherwise) during the multi-participant communication.

Figure 7:
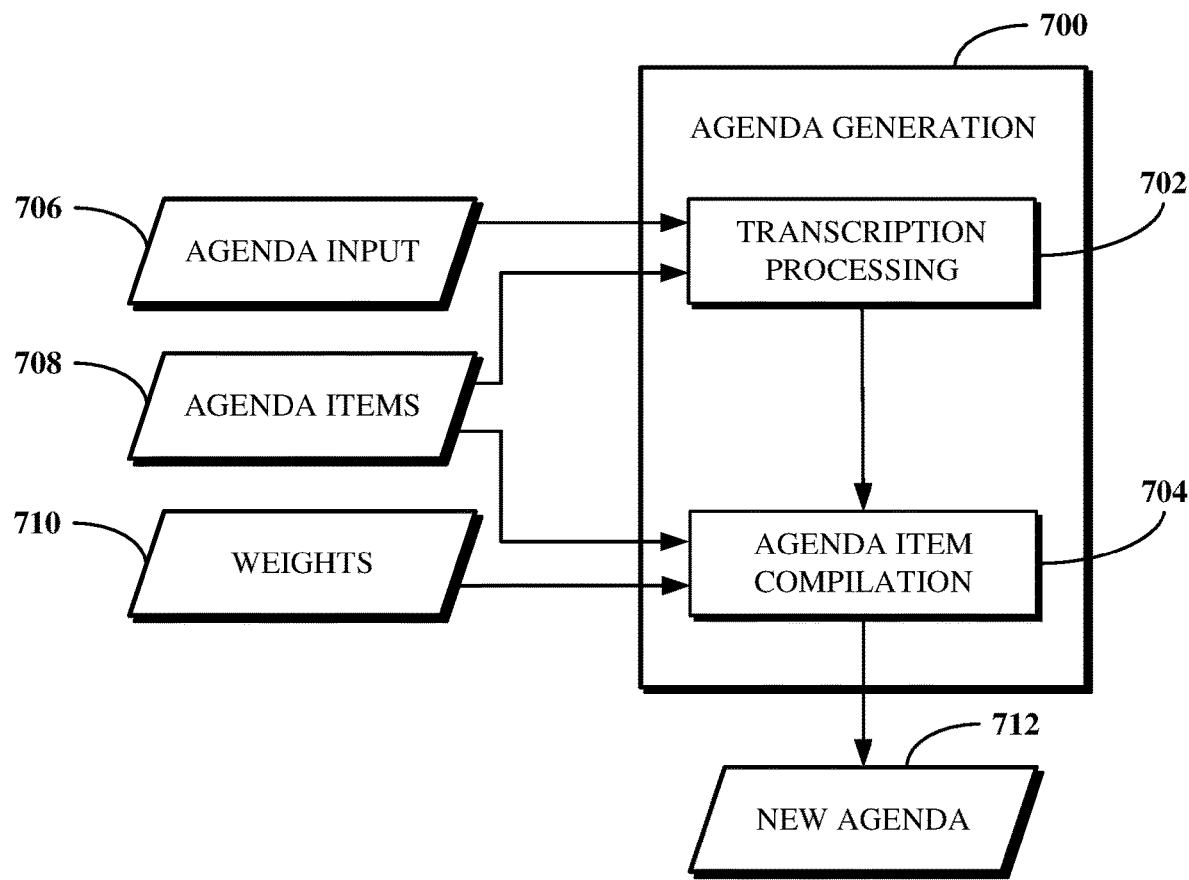
FIG. 7 is a block diagram of an example of agenda generation functionality of an agenda intelligence system.

FIG. 7 is a block diagram of an example of agenda generation functionality of an agenda intelligence system, which may, for example, be the agenda intelligence system 408 shown in FIG. 4. The time scaling functionality of the agenda intelligence system is implemented by an agenda generation tool 700, which may, for example, be the agenda generation tool 508 shown in FIG. 5. The agenda generation tool 700 includes an input processing tool 702, a transcription processing tool 702, and an agenda item compilation tool 704. The agenda generation tool 700 receives as input a transcription 708, agenda items 708, and weights 710 and generates a new agenda 712 as output.

The agenda input 706 refers to input usable to determine one or more agenda items which are not currently agenda items of an agenda. The agenda input 706 may include one or more transcriptions of previous multi-participant communications, selections of text within one or more digital sources internal or external to a software platform which implements the agenda generation tool 700, spoken input received at a voice agent, or other input.

The agenda items 708 include agenda items which were previously included in a different agenda and which were not completed before the multi-participant communication associated with that agenda ended. The agenda items 708 may, for example, be retrieved from a data store which records information associated with incomplete agenda items at an end of a multi-participant communication.

The weights 710 weight values to be given to certain agenda items based on a priority thereof. For example, normal priority agenda items may have a weight of 1.0, low priority agenda items may have a weight which is lower than 1.0, and high priority agenda items may have a weight which is greater than 1.0. The weights 710 may be determined by a user of the software platform or by the agenda intelligence system, for example, based on a context of the multi-participant communication. For example, an agenda item to be determined using the agenda generation tool 700 may have a higher weight where it is included in the agenda generated by the agenda generation tool 700 because it was moved from an agenda of a previous multi-participant communication, where it includes one or more keywords associated with a title assigned to the multi-participant communication, where it has a time allotment that is greater than an average time allotment of the agenda items to include in the agenda, or the like. In another example, an agenda item 708 may have a lower weight where it has a time allotment that is lower than an average time allotment of the agenda items to include in the agenda, where it does not include any keywords in common with a title assigned to the multi-participant communication, or the like.

The transcription processing tool 702 uses the agenda input 706 and the agenda items 708 to determine when the existing agenda items 708 and when other topics to consider as agenda items for the new agenda 712 are being discussed during a multi-participant communication. The transcription processing tool 702 may, for example, refer to software which processes an agenda generated in real-time during the multi-participant communication to determine whether an agenda item has been completed during the multi-participant communication or whether it is incomplete when the multi-participant communication ends. For example, the transcription processing tool 702 may be or include the intelligence processing tool 504 shown in FIG. 5. The transcription processing tool 702 outputs an indication of an agenda item 708 and a timestamp representative of a time during the multi-participant communication in which the agenda item 708 is being discussed by the participants thereof.

The agenda item compilation tool 704 compiles agenda items for a next multi-participant communication and generates the new agenda 712 as an agenda for that next multi-participant communication which includes the compiled agenda items. The agenda item compilation tool 704 uses the output of the transcription processing tool 702, the agenda items 708, and the weights 710 to compile the agenda items to use to generate the new agenda 712. In particular, output from the transcription processing tool 702 indicating ones of the agenda items 708 which have not been completed by the end of the multi-participant communication are used to determine to include those agenda items in the new agenda 712. In another example, agenda items determined based on the agenda input 706, as processed by the transcription processing tool 702, which are not included in the agenda items 708 are included in the new agenda 712. The agenda item compilation tool 704 beyond compiling the agenda items to include in the new agenda 712 may also arrange those agenda items based on the weights 710, for example, in which agenda items with higher weights 710 are arranged near the beginning of the new agenda 712 and agenda items with lower weights 710 are arranged near the end of the new agenda 712.

Figure 8:
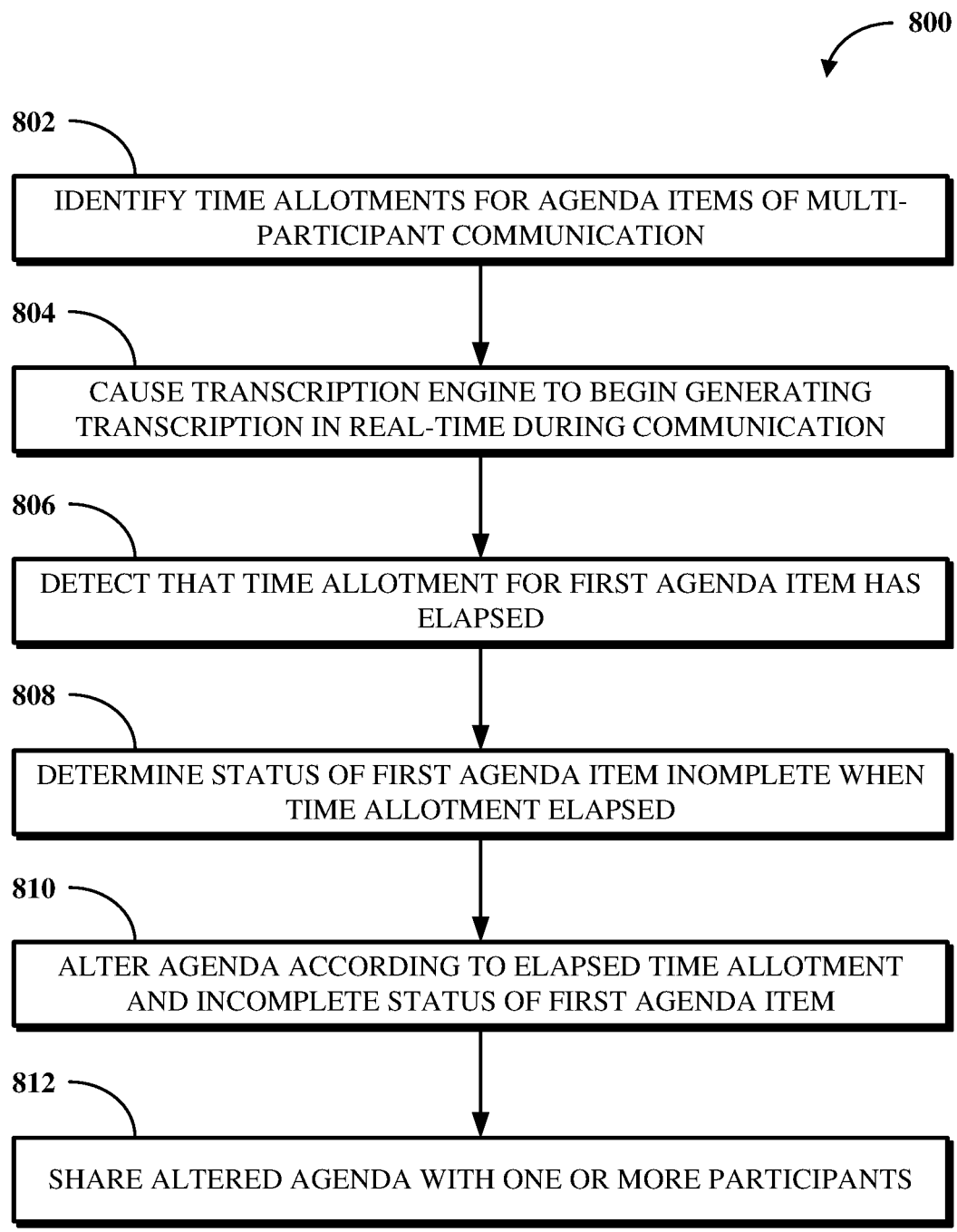
FIG. 8 is a flowchart of an example of a technique for scaling time allotments of agenda items during a multi-participant communication.
Figure 9:
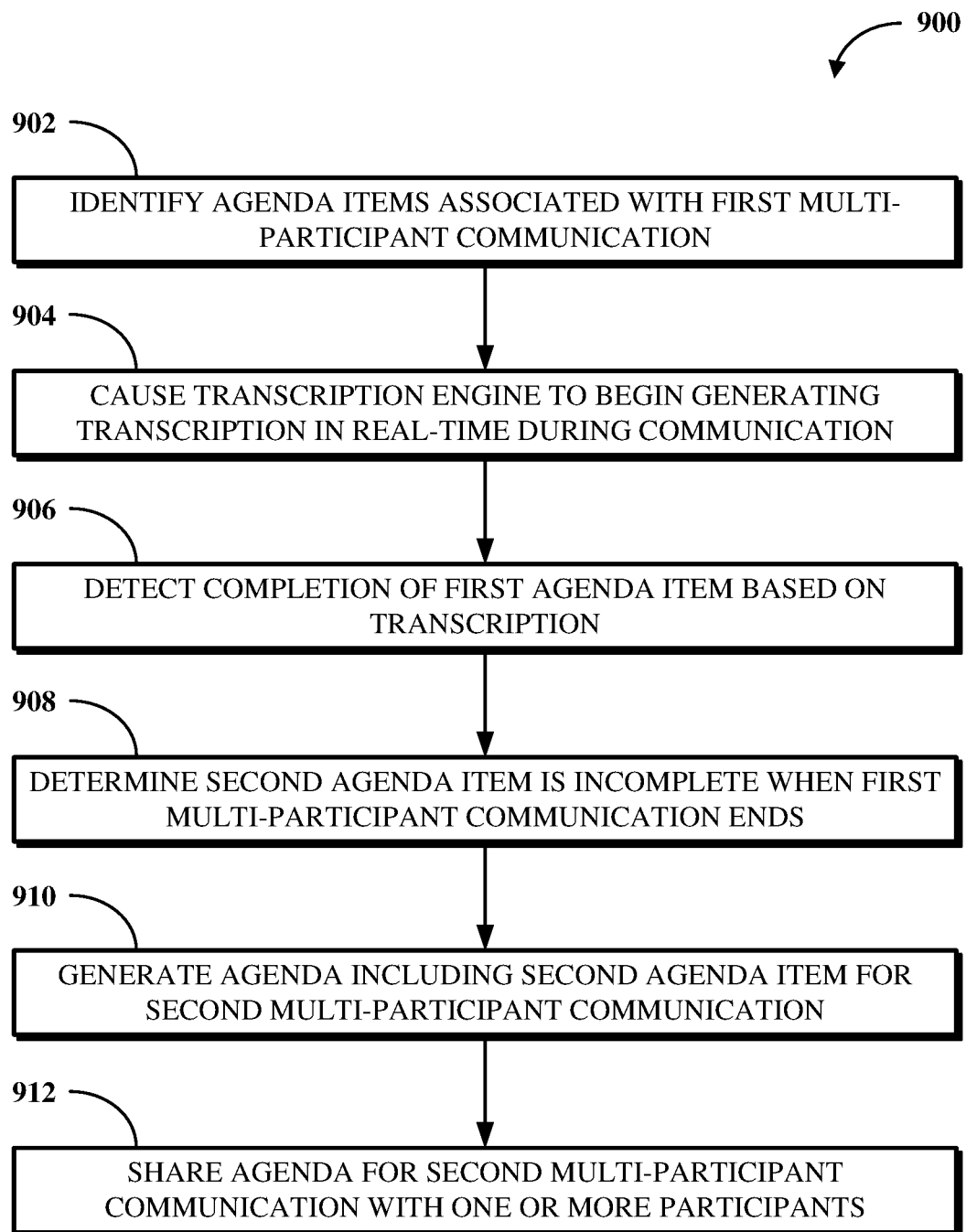
FIG. 9 is a flowchart of an example of a technique for generating an agenda for a next multi-participant communication based on completion of agenda items for a current multi-participant communication.

To further describe some implementations in greater detail, reference is next made to examples of techniques which may be performed by or using an agenda intelligence system. FIG. 8 is a flowchart of an example of a technique 800 for scaling time allotments of agenda items during a multi-participant communication. FIG. 9 is a flowchart of an example of a technique 900 for generating an agenda for a next multi-participant communication based on completion of agenda items for a current multi-participant communication.

The technique 800 and/or the technique 900 can be executed using computing devices, such as the systems, hardware, and software described with respect to FIGS. 1-7. The technique 800 and/or the technique 900 can be performed, for example, by executing a machine-readable program or other computer-executable instructions, such as routines, instructions, programs, or other code. The steps, or operations, of the technique 800 and/or the technique 900 or another technique, method, process, or algorithm described in connection with the implementations disclosed herein can be implemented directly in hardware, firmware, software executed by hardware, circuitry, or a combination thereof.

For simplicity of explanation, the technique 800 and the technique 900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 8, an example of the technique 800 for scaling time allotments of agenda items during a multi-participant communication is shown. At 802, time allotments for agenda items of a multi-participant communication are identified. The time allotments may, for example, be identified within an agenda of the multi-participant communication. For example, the agenda may define the time allotments for some or all of the agenda items relative to a total time for the multi-participant communication.

At 804, a transcription engine begins generating a transcription of the multi-participant communication in real-time during the multi-participant communication. The transcription engine can receive a signal from a communication system which implements the multi-participant communication indicating that the multi-participant communication is beginning or has begun. The signal may, for example, include a command configured to cause the transcription engine to begin generating the transcription. In some cases, the transcription engine may be included in the communication system. In such a case, a function call from a first software service of the communication system which implements the multi-participant communication can be made to a second software service of the communication system which implements the transcription engine, such as to cause the transcription engine to begin generating the transcript.

At 806, the time allotment for a first agenda item of the agenda of the multi-participant communication is detected to have elapsed. The detection that the time allotment for the first agenda item has elapsed is performed using a timestamp, which may be identified within output from the transcription engine or otherwise. For example, where the time allotment for the first agenda item is ten minutes, the first agenda item is a first agenda item in an order of the agenda for the multi-participant communication, and more than ten minutes have elapsed since a start time of the multi-participant communication, the time allotment for the first agenda item is deemed to have elapsed. In some implementations, the start time of the time allotment for the first agenda item may be different from what is defined within the agenda itself, such as due to a previous rescaling of time allotments within the agenda. In such a case, a machine learning model trained for conversational context and dynamics detection can process the real-time transcription to determine when the time allotment for the first agenda item starts during the multi-participant communication, such as based on a determination that the discussion during the multi-participant communication is focused on the first agenda item.

At 808, a status of the first agenda item is determined to be incomplete when the time allotment of the first agenda item is elapsed. In particular, the machine learning model trained for conversational context and dynamics detection can process the real-time transcription of the multi-participant communication such as based on keywords associated with the first agenda item to determine that the first agenda item is still being discussed even after the time allotment therefor has elapsed.

At 810, the agenda of the multi-participant communication is altered according to the elapsed time allotment and incomplete status of the first agenda item. Altering the agenda can include rescaling time allotments for one or more second agenda items of the agenda items to maintain the one or more second agenda items within the agenda for the multi-participant communication. For example, the time allotments for the one or more second agenda items may be rescaled based on weights defined for the agenda items. In another example, the time allotments may be evenly rescaled based on a time remaining in the multi-participant communication. Alternatively, altering the agenda can include moving one or more second agenda items to an agenda generated for a next multi-participant communication to occur after the multi-participant communication ends. For example, moving one or more second agenda items can include removing one or more second agenda items of the agenda items from the agenda for the current multi-participant communication and generating an agenda including the one or more second agenda items for a second multi-participant communication by the software associated with the software platform. For example, the one or more second agenda items to remove from the agenda for the multi-participant communication may be determined using weights defined for the agenda items.

At 812, the altered agenda is shared with one or more participants of the multi-participant communication. For example, a graphical user interface including visual identifiers of the time allotments for the agenda items may be generated and output for display at one or more devices connected to the multi-participant communication. The altered agenda can thus be shared with the one or more participants by altering the visual identifiers of the time allotments and outputting the altered visual identifiers for display at the one or more devices.

In some implementations, the technique 800 may further include altering the agenda for the multi-participant communication responsive to an identification of a new agenda item. For example, a determination can be made that a topic unrelated to the agenda items is being discussed during the multi-participant communication. The agenda for the multi-participant communication may then be altered to include a new agenda item for the topic.

Referring next to FIG. 9, an example of the technique 900 for generating an agenda for a next multi-participant communication based on completion of agenda items for a current multi-participant communication is shown. At 902, agenda items associated with a first multi-participant communication occurring at a first time are identified. The agenda items may be identified within an existing agenda for the first multi-participant communication. For example, the agenda for the first multi-participant communication may in some cases be an agenda generated using the technique 900, such as in which one or more agenda items of the agenda are from a previous multi-participant communication. In another example, the agenda for the first multi-participant communication may include agenda items not previously included in an agenda for a multi-participant communication between the subject participants.

At 904, a transcription engine begins generating a transcription of the first multi-participant communication in real-time during the first multi-participant communication. The transcription engine can receive a signal from a communication system which implements the first multi-participant communication indicating that the first multi-participant communication is beginning or has begun. The signal may, for example, include a command configured to cause the transcription engine to begin generating the transcription. In some cases, the transcription engine may be included in the communication system. In such a case, a function call from a first software service of the communication system which implements the first multi-participant communication can be made to a second software service of the communication system which implements the transcription engine, such as to cause the transcription engine to begin generating the transcript.

At 906, a completion of a first agenda item of the first multi-participant communication is detected based on the real-time transcription. A machine learning model can be used to determine that a discussion of the first agenda item is complete based on the transcription generated in real-time during the first multi-participant communication. For example, the machine learning model can be trained to recognize conversational context and dynamics, such as to understand when the subject of a conversation relates to a completion of an agenda item. For example, spoken input captured from one or more of the participants during the first multi-participant communication about the first agenda item being done, wrapped up, or completed, or otherwise indicating to move on from the first agenda item without related spoken input indicating to come back to the first agenda item later, may be identified by the machine learning model as indicating that the first agenda item is complete. In some implementations, the completion of the first agenda item during the first multi-participant communication can be determined based on input received from one of the participants. For example, a host or other participant of the multi-participant communication can input, select, or otherwise cause a detection of information indicative of a completion of the agenda item. In one example, the user input may be a check placed within a checkbox on a digital representation of the agenda itself.

At 908, a determination is made that a second agenda item of the first multi-participant communication is incomplete when the first multi-participant communication ends. The first multi-participant communication may be considered to have ended when a host thereof selects to close, exit, or otherwise terminate the first multi-participant communication. The determination that the second agenda item is incomplete is made when the multi-participant communication ends and thus when the transcription engine stops generating the transcription. The machine learning model described above can be used to determine that the second agenda item is incomplete, such as based on conversational context and dynamics related to the discussion of the second agenda item during the first multi-participant communication. For example, spoken input captured from one or more of the participants during the first multi-participant communication about resuming discussions on the second agenda item later or otherwise following up further on the second agenda item after some event has occurred or action has been performed may be identified by the machine learning model as indicating that the second agenda item is incomplete. In some implementations, a list of the agenda items of the first multi-participant communication which are completed during the first multi-participant communication can be maintained. Agenda items which are not on that list may thus be identified as agenda items which are incomplete when the first multi-participant communication ends. One such agenda item which is incomplete when the first multi-participant communication ends is the second agenda item.

At 910, an agenda including the incomplete second agenda item is generated for a second multi-participant communication to occur at a second time after the first time. Generating the agenda can include compiling the second agenda item and a number of other agenda items to cover in the second multi-participant communication. For example, the machine learning model described above can be used during the first multi-participant communication to identify agenda items which were not previously identified as agenda items therefor, such as based on spoken input using keywords unrelated to the previously identified agenda items for the first multi-participant communication. Such a newly identified agenda item may, for example, be referred to as a third agenda item. Thus, the third agenda item may be identified using a transcription of the first multi-participant communication generated using the transcription engine. Alternatively, the third agenda item may be identified based on an user selection of text from a digital content source. As a further alternative, the third agenda item may be identified based on spoken input from an user of the software platform collected using an agent of the software platform. The agenda generated for the second multi-participant communication may thus, in some implementations, include the second agenda item and the third agenda item. The agenda may be stored temporarily until it is committed to the second multi-participant communication, such as by the sharing of the agenda with one or more persons who will be participants of then second multi-participant communication.

At 912, the agenda generated for the second multi-participant communication is shared with one or more persons who will be participants in the second multi-participant communication. Sharing the agenda with the one or more persons may include uploading the agenda over a software service to accounts associated with those persons or for access by such accounts, transmitting the agenda over one or more modalities, or the like. The one or more persons may include one or more of the participants of the first multi-participant communication. In some cases, the one or more persons may include one or more persons who were not participants of the first multi-participant communication. For example, one or more new participants can be identified based on an agenda item included in the agenda generated for the second multi-participant communication. For example, the person, who may in some cases be a user of a software platform implementing the multi-participant communications and agenda intelligence, may be identified by searching metadata associated with users of the software platform based on one or more keywords identified within a transcription of the first multi-participant communication. For example, the metadata associated with the users of the software platform may include internal data of the users of the software platform. In another example, the metadata associated with the users of the software platform may include data retrieved from a source external to the software platform. In some implementations, the agenda generated for the second multi-participant communication may indicate an action item assigned to a user of the software platform, who may be identified as described above.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    initiating, by a communication system of a unified communications as a service software platform, a video conference between multiple client devices;
    transmitting, from the communication system to a transcription engine of the unified communications as a service software platform, a signal configured to cause the transcription engine to obtain and perform automatic speech recognition against audio data of the video conference to generate and output a real-time transcription of the video conference;
    detecting, during the video conference by an agenda intelligence system of the unified communications as a service software platform processing the real-time transcription output by the transcription engine to identify a timestamp indicative of a time at which a discussion of an agenda item began during the video conference, that a time allotment for the agenda item has elapsed;
    determining, during the video conference by the agenda intelligence system using a machine learning model trained for contextual recognition processing the real-time transcription and the timestamp, that a status of the agenda item is incomplete when the time allotment is detected to have elapsed;
    detecting, during the video conference by the agenda intelligence system using the machine learning model, that a new topic has been discussed for more than a threshold of time;
    adding, during the video conference by the agenda intelligence system using the machine learning model, a new agenda item corresponding to the new topic;
    altering, during the video conference by the agenda intelligence system using output of the machine learning model, an agenda for the video conference to change the time allotment for the agenda item based on the incomplete status determined for the agenda item, the addition of the new agenda item, and according to a priority of the agenda item, the priority indicating a weight value for changing the time allotment;
    identifying a participant based on one or more keywords from the real-time transcription, the new agenda item, and metadata associated with the participant, wherein the participant is not attending the video conference; and
    sending an invite and the new agenda item to the participant, wherein the new agenda item includes an action item assigned to the participant.

2. The method of claim 1, wherein altering the agenda for the video conference comprises
    rescaling time allotments for one or more other agenda items of the video conference to maintain the one or more other agenda items within the agenda for the video conference.

3. The method of claim 2, wherein the time allotments for the one or more other agenda items are rescaled according to priorities of the one or more other agenda items, the priorities indicating weight values for changing the time allotments for the one of more other agenda items.

4. The method of claim 2, wherein the time allotments for the one or more other agenda items are evenly rescaled based on a time remaining in the video conference.

5. The method of claim 1, wherein the video conference is a first video conference, and wherein altering the agenda for the video conference comprises:
    removing one or more other agenda items of the video conference from the agenda for the first video conference based on the changing of the time allotment for the agenda item; and
    generating an agenda including the one or more other agenda items for a second video conference.

6. The method of claim 5, wherein the machine learning model determines the one or more other agenda items to remove from the agenda for the first video conference according to priorities of the one or more other agenda items, the priorities indicating weight values for the one or more other agenda items which are lower than the weight value for changing the time allotment for the agenda item.

7. The method of claim 1, wherein determining that the status of the agenda item is incomplete comprises:

using the machine learning model to process the real-time transcription based on keywords associated with the agenda item.

8. The method of claim 1, further comprising:
generating a graphical user interface including visual identifiers of time allotments for agenda items of the video conference, the agenda items including the agenda item and the time allotments including the time allotment; and
outputting the graphical user interface for display at one or more of the multiple client devices during the video conference.

9. The method of claim 8, wherein altering the agenda for the video conference comprises:
altering the visual identifiers of the time allotments; and
outputting the altered visual identifiers for display at the one or more of the multiple client devices during the video conference.

10. The method of claim 1, further comprising:
determining that a topic unrelated to agenda items of the video conference is being discussed during the video conference; and
altering the agenda for the video conference to include a new agenda item for the topic.

11. A system, comprising:
one or more servers configured to:
initiate, by a communication system of a unified communications as a service software platform, a video conference between multiple client devices;
transmit, from the communication system to a transcription engine of the unified communications as a service software platform, a signal configured to cause the transcription engine to obtain and perform automatic speech recognition against audio data of the video conference to generate and output a real-time transcription of the video conference;
detect, during the video conference by an agenda intelligence system of the unified communications as a service software platform processing the real-time transcription output by the transcription engine to identify a timestamp indicative of a time at which a discussion of an agenda item began during the video conference, that a time allotment for the agenda item has elapsed;
determine, during the video conference by the agenda intelligence system using a machine learning model trained for contextual recognition processing the real-time transcription and the timestamp, that a status of the agenda item is incomplete when the time allotment for the agenda item is detected to have elapsed;
detect, during the video conference by the agenda intelligence system using the machine learning model, that a new topic has been discussed for more than a threshold of time;
add, during the video conference by the agenda intelligence system using the machine learning model, a new agenda item corresponding to the new topic;
alter, during the video conference by the agenda intelligence system using output of the machine learning model, an agenda for the video conference to change the time allotment for the agenda item based on the incomplete status determined for the agenda item, the addition of the new agenda item, and according to a priority of the agenda item, the priority indicating a weight value for changing the time allotment;
identify a participant based on one or more keywords from the real-time transcription, the new agenda item, and metadata associated with the participant, wherein the participant is not attending the video conference; and
send an invite and the new agenda item to the participant, wherein the new agenda item includes an action item assigned to the participant.

12. The system of claim 11, wherein the communication system includes the transcription engine.

13. The system of claim 11, wherein the agenda is altered to maintain the agenda item and one or more other agenda items within the agenda for the video conference.

14. The system of claim 11, wherein the agenda for the video conference is altered by another agenda item of the agenda moving to an agenda generated for a next video conference to occur after the video conference ends.

15. An apparatus, comprising:
a memory; and
a processor configured to execute instructions stored in the memory to:
initiate, by a communication system of a unified communications as a service software platform, a video conference between multiple client devices;
transmit, from the communication system to a transcription engine of the unified communications as a service software platform, a signal configured to cause the transcription engine to obtain and perform automatic speech recognition against audio data of the video conference to generate and output a real-time transcription of the video conference;
detect, during the video conference by an agenda intelligence system of the unified communications as a service software platform processing the real-time transcription output by the transcription engine to identify a timestamp indicative of a time at which a discussion of an agenda item began during the video conference, that a time allotment for the agenda item has elapsed;
determine, during the video conference by the agenda intelligence system using a machine learning model trained for contextual recognition processing the real-time transcription and the timestamp, that a status of the agenda item is incomplete when the time allotment is detected to have elapsed;
detect, during the video conference by the agenda intelligence system using the machine learning model, that a new topic has been discussed for more than a threshold of time;
add, during the video conference by the agenda intelligence system using the machine learning model, a new agenda item corresponding to the new topic;
alter, during the video conference by the agenda intelligence system using output of the machine learning model, an agenda for the video conference to change the time allotment for the agenda item based on the incomplete status determined for the agenda item, the addition of the new agenda item, and according to a priority of the agenda item, the priority indicating a weight value for changing the time allotment;
identify a participant based on one or more keywords from the real-time transcription, the new agenda item, and metadata associated with the participant, wherein the participant is not attending the video conference; and send an invite and the new agenda item to the participant, wherein the new agenda item includes an action item assigned to the participant.

16. The apparatus of claim 15, wherein, to alter the agenda for the video conference, the processor is configured to execute the instructions to:
rescale time allotments for one or more other agenda items to maintain the one or more other agenda items within the agenda for the video conference.

17. The apparatus of claim 15, wherein, to alter the agenda for the video conference, the processor is configured to execute the instructions to:
move one or more other agenda items to an agenda generated for a next video conference.

18. The apparatus of claim 15, wherein, to alter the agenda for the video conference, the processor is further configured to execute the instructions to:
alter a visual identifier of the time allotment of the agenda item output to a graphical user interface.

19. The apparatus of claim 15, wherein the processor is further configured to execute the instructions to:
alter the agenda for the video conference in response to an identification of a new topic discussed during the video conference determined based on the real-time transcription.

20. The apparatus of claim 15, wherein, to determine that the status of the agenda item is incomplete when the time allotment for the agenda item elapses, the processor is configured to execute the instructions to:
determine, by the machine learning model processing the real-time transcription, that a focus of a conversation within the video conference remains on the agenda item following the elapsing of the time allotment for the agenda item.

* * * * *